Jan. 21, 1958  W. C. DRESSER ET AL  2,820,703
METHOD FOR PREPARING COMPOST
Filed May 19, 1954  2 Sheets-Sheet 1
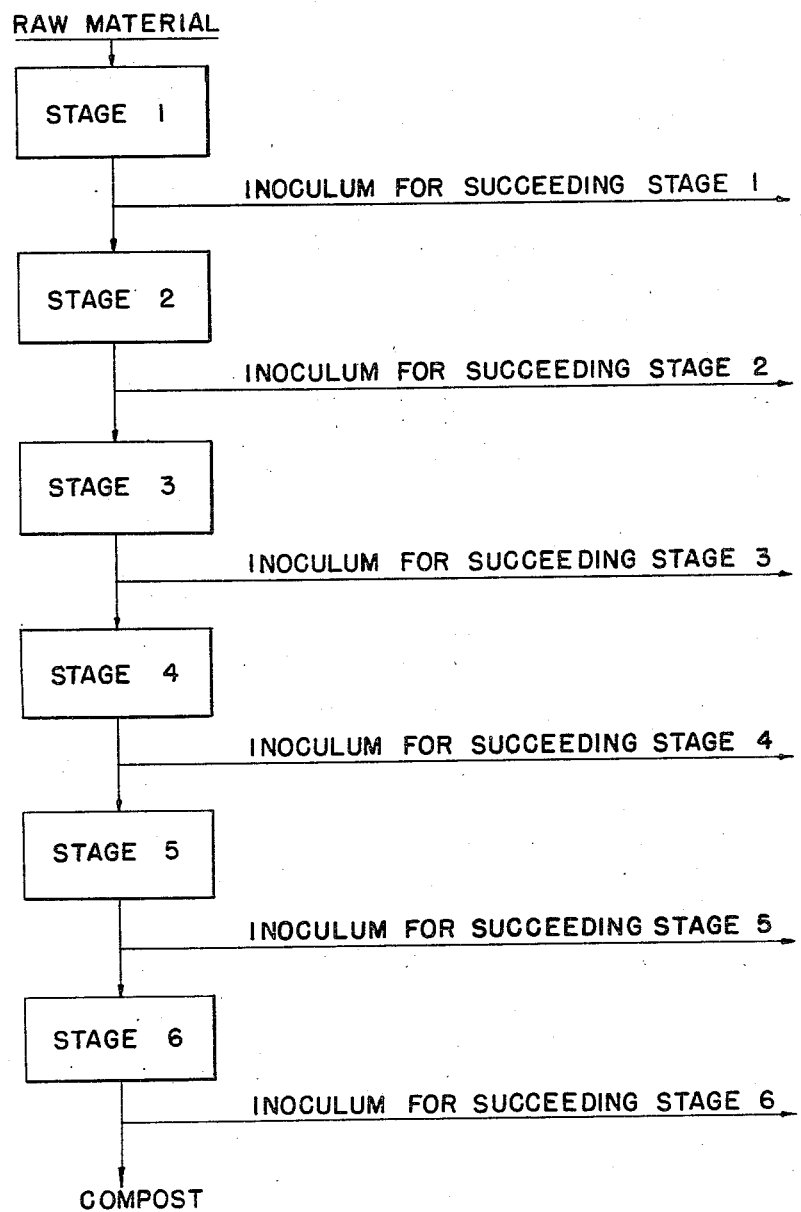
INVENTORS.
WILFRED C. DRESSER
ROBERT D. JACOBSON
BY

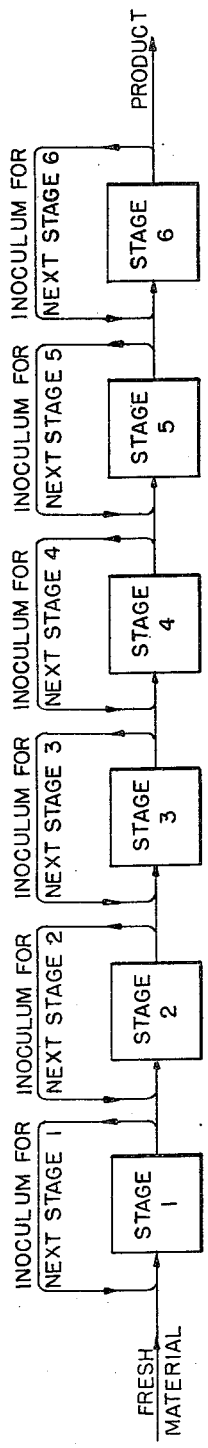

United States Patent Office 2,820,703
Patented Jan. 21, 1958

2,820,703

METHOD FOR PREPARING COMPOST

Wilfred Carlton Dresser, East Orange, and Robert Dale Jacobson, Hillsdale, N. J., assignors to American Cyanamid Company, New York, N. Y., a corporation of Maine Application May 19, 1954, Serial No. 430,786

4 Claims. (Cl. 71—9)

This invention relates to a novel process for treating organic waste material. More particularly, this invention is concerned with a multi-stage process whereby organic waste material of animal and vegetable origin is converted to useful compost.

The decomposition of organic plant and animal material is brought about by the action of microrganisms. Through their activity, highly complex chemical structures are decomposed to simpler forms. Such decomposition however is seldom accomplished in one stage. On the contrary, it usually takes place in a stepwise fashion through the formation of a series of intermediate residues. Thus, the incompletely decomposed products left from the action of a particular group of microorganisms are further attacked by other microbes which have the ability to continue the decomposition. Eventually the initial material loses its original identity and is transformed into completely oxidized end products (note Waksman and Starkey, Soil and The Microbe, John Wiley & Sons (1931) p. 75).

In a like manner the conversion of plant and animal waste material into compost is brought about by the action of microorganisms. Various constituents are present in waste material such as for example carbohydrates, starches, amino acids and other simple, water soluble structures, and the more complex hemicelluloses, celluloses, proteins, fats, oils and waxes. These compounds are acted upon by many types of aerobic and anaerobic bacteria and fungi which utilize the waste constituents as a source of energy. Since the nature of the waste material and the types of microorganisms present therein are variable functions, the rate of decomposition from waste to compost also varies within wide limits. For example, if a quantity of organic waste material were to undergo decomposition without disturbance, it would take a period of several months before desirable compost would result. This is so because the optimal conditions for rapid propagation differ from one organism to another. Thus it takes a long period of time before each type of microorganism becomes adjusted to changes in moisture content, pH, temperature and other variable conditions.

We have now discovered a process for composting organic waste material which is rapid, efficient and economical. Our process requires neither the construction of special equipment nor the addition of bacterial inoculi. In a general way, our process comprises a simple, unique, multi-stage system which provides for rapid and simultaneous conversion of industrial and domestic waste into useful compost. Any kind of organic waste may be used as starting material in our process including manure, human waste, sewage sludge, mycelia from antibiotic fermentation beers, spent coffee grounds, sawdust, garbage, animal liter and similar matter. The humus-like material resulting from our process is valuable as a fertilizer and soil nutrient for use on impoverished lands. It affords not only a source of nitrogen, phosphorous and potassium in a non-leaching form, but also traces of elements such as cobalt, iron, nickel, boron, copper, zinc, magnesium, calcium and chromium, and vitamins needed for proper vegetation and human growth.

One of the most important advantages of the method of the present invention is that it permits the development of an optimal bacterial population in each stage of the process. As the material is transferred from cell to cell, the class of microorganisms which are most efficient at decomposing the constituents of the organic waste present in each stage, act upon that particular substrate. When the material passes on to the next successive stage, it is further decomposed by the bacteria present therein. Thus, the development of the bacterial population may be such that the more complex hemicelluloses and celluloses may be attacked in the first stage. On passing to the next stage, the partially digested material may be further decomposed by the action of those microorganisms which attack fats, oils and waxes. In the third and subsequent stages, other constituents may be attacked until finally, the original material has been completely converted to compost.

It is well known in the composing art that the digestion of organic wastes can be hastened considerably by employing special bacterial inocula. Since the character of these bacterial cultures is usually such that they are highly concentrated and extremely virile, the digestion of the organic waste material proceeds at a rapid pace.

In accordance with our process, the rate of digestion may be conveniently speeded-up by a method of bacterial self-inoculation. No additional inoculants are required. The growth of the bacterial population is preferably developed by employing a portion of the digesting waste in each stage as a bacterial inoculum for the waste coming in from the preceding stage. This process of continuous self-inoculation causes the development of microorganisms into classes, wherein each class is peculiarly characteristic with respect to a particular stage. In like fashion, the digestion of the waste material proceeds along a similar pattern, the substrate most susceptible to the action of bacteria in a particular stage, being acted upon during that stage.

It is to be noted also that in a multi-stage composting process such as this, each step of the process should be so controlled and characterized as to enable one operator to duplicate the work of another. This is preferably accomplished in our process by defining the progress of the composting in terms of chemical oxygen demand (COD). Fresh, uncomposted material has a COD of more than 12,000 units. Composted material which has undergone the desired decomposition process up to (but not including) the ash stage has a COD of below 7,000 units but not less than 3,000 units. Thus, as is readily apparent, the various stages of the composting process in a multi-stage system may be fixed between these two well-defined limits. For example, the first stage of decomposition, in accordance with the one feature of this invention, may have a COD of less than 12,000 units but not less than 10,000 units. The second stage of decomposition may be defined as one which has a COD of less than 10,000 units but not less than 9,000 units. The third stage of decomposition may be one which has a COD of less than 9,000 units but not less than 8,000 units, and so on. The final stage of composting will be considered to have been reached when the COD of the composted material is below 7,000 units but not less than 3,000 units. Material having a COD of less than 3,000 units is considered "burned-out" and unsuitable as compost. In other words the material is undesirable since the microbiological conversion has progressed to such point that there is present in the mass an insufficient quantity of organic material to serve the function of compost.

It is to be particularly noted that the number of stages which can be used in our process may vary greatly depending upon the nature of the waste material. In some cases, a two-stage process will be sufficient to reduce the organic waste compost. In other cases, 5 or perhaps 6 stages may be necessary to effect complete decomposition. Furthermore, the seeding (self-inoculation) steps may be modified extensively to include a wide variety of permutations and groupings, and thus provide a broad range of microbial activity. Neither the number of stages nor the variety of seedings are to be considered a departure from the scope of the present invention but are to be considered as embraced by the broad concept thereof.

The process of our invention may be further modified in several ways. For example, the last stage of the process may be "after-cured," meaning that it is not seeded at all, but is allowed to digest further for a predetermined period of time, usually about 4 to 12 hours, and then bagged. In another modification, the seed from each step may be split—one portion being added to a fresh material entering the same stage as in the next batch and another portion added to material entering the previous stage of the next batch. The simple-seeding type process may be still further modified by a pre-seeding step, i. e., where there is a stage of composting fresh material before seeding begins. A modification employing interrupted seeding may be employed wherein the seed (inoculum) is obtained from stage I and stage III, but not from stage II. As another modification, one or more wastes may be separately composted before mixing and continuing the composting. As still another modification, the seed from any or all of the stages may be aged before adding it to material entering the same stage in the following batch.

The principles of our invention will be further described and illustrated by reference to the accompanying drawing, wherein:

Figure I is a flow-sheet illustrating the start-up procedure used in our process.

Figure II is a diagrammatic view of our process illustrating the simple-seeding 6-stage process of our invention.

Referring to Figure I of the drawings, the raw starting material is allowed to digest until it reaches a stage of decomposition recognized in the art as the first stage and showing on analysis a chemical oxygen demand of about 10,000 units. The material is removed from the cell and segregated into 2 portions. One of these is used as the inoculum for fresh, incoming raw material, with which it is mixed and placed in cell No. 1. The remaining portion is transferred to cell No. 2 (stage II) and allowed to digest further. When the COD of stage II measures about 9,000 units, the material is removed and segregated into two portions. One of these portions is used as the inoculum for material being transferred from stage I to stage II, with which it is mixed and placed in cell No. 2. The remainder of the material from stage II is transferred to cell No. 3 (stage III).

The process is continued from stage to stage in the manner described until the COD demand of the material is about 6,000 units. A portion of the mass is then segregated, mixed with a portion of the material from the previous stage (stage V) and returned to stage VI. The remainder, which is the final product is further aerated and bagged, or it may be bagged immediately in suitable containers.

Referring now to Figure II of the accompany drawing, the following is a specific embodiment of the manner in which the present invention may be conveniently carried out when all stages of the process are in operation:

A raw start-up material having the following proportions may be used:

| Raw materials: | Weight (pounds) |
|---|---|
| Sewage sludge cake | 300 |
| Spent coffee grounds | 150 |
| Manure and bedding | 100 |
| Ammonium sulfate | 9 |
| Compost | 110 |
| Phosphate rock | 30 |
| Potassium chloride | 3 |

The manure is pre-shredded to reduce the particles to less than half inch in length for material handling purposes. This is particularly advantageous when there is a large quantity of animal bedding which may be straw, cedar chips, peanut shells, bagasse or peat moss. The shredding step also affords the added advantage of facilitating a more rapid decomposition of the cellulose materials.

A layer about 6 inches thick of spent coffee grounds is spread upon a concrete slab and a layer of sludge is added. The proportion of manure, compost and chemicals is scattered over the top. Another series of layers of coffee grounds, manure, sludge, compost, etc., is spread thereon. This process is repeated until all the raw materials are in one pile. The finished compost acts primarily as a moderator for moisture content, and aids in obtaining a mixture of desirable handling and physical composting characteristics. The pile is then thoroughly mixed. A predetermined quantity, about 10 to 20 percent, of the preceding batch of material (stage I) which has composted only one day is then added to the raw material. A convenient quantity for handling purposes is about 125–175 pounds. The mixture is placed in a compost cell (stage I), the lid of the cell is lowered, leaving a space of about 1 inch to permit air to enter and moisture to escape. The temperature of the compost material at this time is about 78° F. and analyzes 12,000 units COD at pH 7.0. A small electric heater of about 400 watt capacity may be suspended if preferred from the lid to provide a desired amount of additional heat. This, however, is necessary only in cold weather. The cell is now allowed to stand and digest for a period of about 8 to 24 hours.

One day after the operation has begun, the temperature of the compost mass in stage I usually rises to about 110° F. When the material is dropped from the compost cell, 150 pounds are separated to serve as seed for the next batch. A convenient quantity (about 150 pounds) of seed from the preceding batch (stage II) which has now composted two days, is mixed proportionately with the remainder of the batch while being transferred into the hopper of a shredder. The latter throws the material into the next cell (stage II).

This method of transferring the contents from one cell to another is preferred because it permits a convenient manner of aerating the material during the composting process. Aeration not only provides fresh oxygen for the aerobic bacteria but also reduces the carbon dioxide content of the compost mass.

The rate at which oxygen is used up by the microorganisms varies from stage to stage. In the first two stages about ¼ of the oxygen is used in the first hour after mixing; in the third and fourth—more than ½; in the fifth and sixth—less than ¼. Most of the oxygen is used up by the twelfth hour so that aeration is usually desirable after a period of about 8 hours. Delay has the effect of lengthening the process. Too frequent aeration may lower the temperature and thus slow up the process.

The shredding step in our process breaks up aggregates of material, spreads the bacteria onto fresh surfaces, mixes the mass thoroughly and removes by evaporation the excess water which in large amounts tends to smother the composting bacteria. It also provides a means of controlling the temperature at each stage within certain desired limits necessary for rapid composting. Table II shows the temperature limits which are most desirable for each stage of the process.

At the conclusion of the compost period for stage II (8–24 hours), the segregating, inoculating, mixing and shredding steps outlined above are repeated. The material is allowed to drop to the floor, tranferred into the shredder and therethrough into stage III while being mixed with an inoculum from the previous stage III. The mass is allowed to compost for the usual 8–24 hour period. At the end of the period the contents of the cell in stage III are subjected to the identical process outlined above.

At the end of four days, the material has reached a temperature of about 160° F. and has been seeded with four 150 pound portions of the batch preceding it, these portions being one day older than the material to which they were added. After the fourth seeding the material is shredded every 8 hours until at the end of the sixth day it analyzes about 6000 units of COD. A portion of the mass is now segregated and mixed with the material coming into stage VI from stage V. The remainder, which is the final product, may be further mixed before bagging, or may be bagged directly in suitable containers for shipment.

The following table indicates the measurements made upon the material during processing. The progress of the decomposition process is indicated in terms of COD units.

*Table I*

| End of Day | No. COD Units | Moisture Content, Percent | Batch Weight, Lbs.[1] | Temp., °F. |
|---|---|---|---|---|
| 0 | 12,000 | 60 | 740 | 78 |
| 1 | 10,000 | [2] 64 | 786 | 110 |
| 2 | 9,000 | 58 | 654 | 140 |
| 3 | 8,000 | 55 | 584 | 150 |
| 4 | 7,000 | 48 | 420 | 160 |
| 5 | 6,500 | 41 | 328 | 145 |
| 6 | 6,000 | 36 | 300 | 130 |

[1] Includes seed material from previous batch.
[2] Moisture content increases due to water liberated by bacterial action. Frequent shredding and heating drives off this water.

It is to be understood that the temperature conditions given above are cited as exemplary for one specific embodiment of our process. In actual practice, under varying conditions of material availability, the number of stages employed, etc. the temperature may vary considerably within well-defined limits, as shown in Table II.

*Table II*

| End of Stage No. | COD Units | Temp. °F. |
|---|---|---|
| 0 | 12,000 | 40–80 |
| 1 | 10,000 | 90–110 |
| 2 | 9,000 | 125–140 |
| 3 | 8,000 | 135–150 |
| 4 | 7,000 | 150–160 |
| 5 | 6,500 | 135–145 |
| 6 | 6,000 | 120–130 |

It is important that the pH of the compost mass during the various stages of digestion be kept within a range of not less than 6.0 and not more than 8.0. Beyond these limits the action of the aerobic bacteria is slow, even to the point of complete stoppage. High pH material may be modified by adding acid type wastes, such as sawdust or coffee grounds. In extreme cases, acid inorganic salts have beneficial effects as additives. If the raw starting material has a high acid content, the addition of lime or limestone aids in bringing the pH within the required limits.

The frequent milling and shredding operations at each stage of our process facilitate the control of temperature and moisture content and permit the addition of special nutrients such as inorganic salts, nitrogenous materials and vitamins as well as materials which modify the rate of heat dissipation and pH. They also permit the exchange of atmosphere, provide fresh surface for attack by bacteria and mix the material during the process. In addition, the between-stages milling operations, and the compaction of the waste material during each stage of the process provide intimate contact between the microorganisms and the nutrients, thus fostering rapid propagation of bacteria.

There are many variables in regard to the quantity and quality of the raw materials which require flexibility and adaptability in the method of this invention. For example, it is known that manure from a given animal varies greatly from day to day depending upon the diet and health of the animal. It is known also that manure from different species of animals varies greatly in chemical composition and flora. The straw and bedding incorporated with the manure may differ both in quantity and in type. Sewage sludge is still another variable, since it comes from greatly fluctuating industrial sources and is filtered with varying amounts and types of chemicals. The manure chosen for the composting may or may not be fresh, depending upon availability, carting and housekeeping facilities. Other variables will be apparent to those skilled in the art.

In contradistinction to the above, there are many variables which can be controlled during the process. For example, the length of time taken for grinding, milling, mixing, etc. may be kept within well-defined limits. The temperature of the compost itself may be controlled by such grinding and mixing steps, as well as the moisture content at each stage. The pH of the compost may be readily controlled by the addition of suitable acid or alkali substances such as organic waste material suitable for composting, or inorganic salts. The ratio of one type of material to another may be readily controlled. For example, sludge to manure or animal litters to fermentation mycelia. The number of stages employed during the process and the amount of material used for the inoculation of each successive stage are also variables which may be readily controlled by the operator.

The chemical oxygen demand of organic material having biological activity, such as a compost mass, may be determined in accordance with several well known processes such as that disclosed in Soil Science, page 183, volume 65 (1948), by E. R. Graham, which involves a titrimetric technique.

In carrying out the present invention, we have modified Graham's method to the extent that the chemical oxygen demand may be determined by titration to an end point using orthophenanthroline indicator. Although this modified method is intended to be included within the scope of the present invention, it is not considered to be limitative, since other processes known to those skilled in the art may conveniently be used for determination of chemical oxygen demand.

Following is a brief description of the modified Graham technique: A representative sample of compost is dried in an oven overnight and ground with a mortar and pestle. To a weighed quantity of the sample (0.25 gms.) is added 1.0N potassium dichromate (50 ml.) and the mixture is diluted with distilled water (500 ml.). Sulfuric acid (100 ml.) is added and the mixture is refluxed for a period of one hour. After cooling, the mixture is diluted to a volume of 1 liter with tap water, mixed thoroughly, and 250 ml. volume is titrated with 0.5N ferrous ammonium sulfate to an end point, using 10 drops of orthophenanthroline as an indicator.

COD units = 25.0 − (ml. ferrous ammonium sulfate) × 640. The factor 640 comes from W. Moore's dichromate reflux method for determination of oxygen consumed, 50 ml. of 1N potassium dichromate solution with 0.5N ferrous ammonium sulfate and diluted four times = 640.

Although I have described a specific embodiment of my inventive concept, I consider the same not to be limited thereby nor to the specific substances mentioned therein but to include various other substances of equivalent

We claim:

1. A method of composting organic waste material which comprises the steps of mixing a quantity of partially composted organic material with a quantity of substantially undecomposed organic material and allowing the mixture to digest until the chemical oxygen demand of the mixture has decreased substantially, dividing said partially decomposed mixture, mixing a part of said decomposed material with substantially undecomposed organic waste material and allowing said mixture to digest, mixing another part of said partially decomposed material with organic waste material which has a lower chemical oxygen demand and allowing said mixture to digest until it has a substantially lower chemical oxygen demand, dividing said decomposed material and continuing the process of mixing part of the digested material with material of higher chemical oxygen demand organic material and part with material of lower chemical oxygen demand and digesting until the latter is composted.

2. The method in accordance with claim 1 in which the final digestion of the mixed materials is continued until the chemical oxygen demand is between about 3000 units and 7000 units.

3. A method of composting organic waste material which comprises the steps of mixing a quantity of partially composted organic material with a quantity of substantially undecomposed organic material and allowing the mixture to digest until the chemical oxygen demand of the mixture has decreased to less than about 10,000 chemical oxygen demand units, dividing said partially decomposed mixture, mixing a part of said decomposed material with substantially undecomposed organic waste material and allowing said mixture to digest, mixing another part of said partially decomposed material with organic waste material which has a lower chemical oxygen demand and allowing said mixture to digest until it has a substantially lower chemical oxygen demand, dividing said decomposed material and continuing the process of mixing part of the digested material with material of higher chemical oxygen demand organic material and part with material of lower chemical oxygen demand and digesting until the material has a chemical oxygen demand between about 3000 and 7000 units.

4. In a multi-stage process of composting waste organic matter by decomposition with bacteria the improvement which comprises mixing in one stage of the process partially decomposed organic material containing bacteria with organic material having a higher chemical oxygen demand and in another stage with partially decomposed bacteria-containing organic material having a lower chemical oxygen demand and allowing said mixtures to digest to a substantially lower chemical oxygen demand value, and recovering the material of the latter stage as compost.

References Cited in the file of this patent

UNITED STATES PATENTS

| | | |
|---|---|---|
| 1,597,724 | Cooke | Aug. 31, 1926 |
| 2,043,265 | Roeder | June 9, 1936 |
| 2,178,818 | Earp-Thomas | Nov. 7, 1939 |
| 2,337,686 | Sherman | Dec. 28, 1943 |
| 2,474,833 | Eweson | July 5, 1949 |
| 2,535,627 | Earp-Thomas | Dec. 26, 1950 |

FOREIGN PATENTS

| | | |
|---|---|---|
| 521,894 | Great Britain | June 4, 1940 |

OTHER REFERENCES

Organic Gardening, vol. 20, No. 8, August 1952, page 12, "City With Golden Garbage," by A. W. Martinez, published by Rodale Press, 6th and Minor Sts., Emmaus, Penna.